June 1, 1965 S. PINCUS ETAL 3,187,069
MAKING FOAMED ARTICLES
Filed Sept. 28, 1962
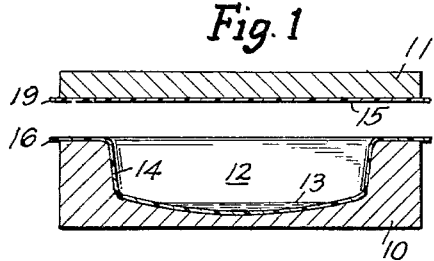
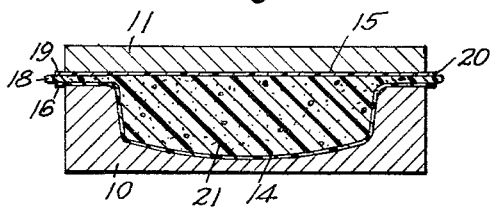
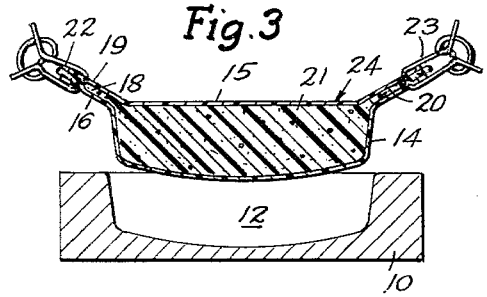
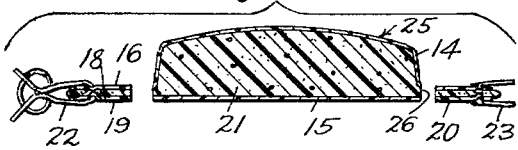
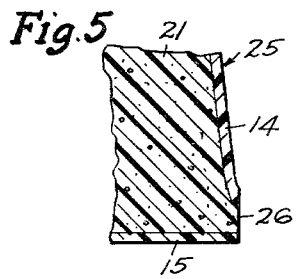
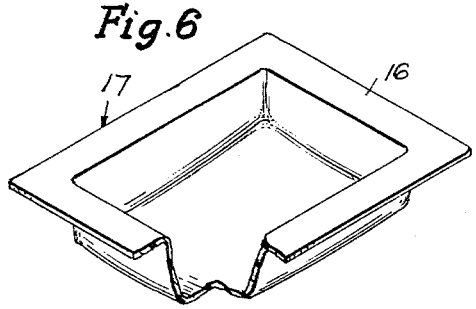
INVENTORS
Seymour Pincus
Edwin G. Krakauer
BY
Harry Jacobson
ATTORNEY

3,187,069
MAKING FOAMED ARTICLES
Seymour Pincus, Brooklyn, and Edwin G. Krakauer, Roslyn Heights, N.Y., assignors to Kay Manufacturing Corp., Brooklyn, N.Y., a corporation of New York
Filed Sept. 28, 1962, Ser. No. 226,839
10 Claims. (Cl. 264—45)

This invention relates to the method of molding cellular articles and particularly to the molding of foamed articles such as those of foamed polyurethane with the aid of plastic films.

"One shot" polyurethane and other foams, after being formed in a mold, lack gel strength or are so weak as barely to support their own weight, and have heretofore needed extraneous support for manipulation or conveyance to a curing station and throughout the curing period which usually takes place in an oven. Since the molded article, though gel set, could not be removed from the mold without being damaged, both the mold and the article contained therein have been placed in the oven at the curing station, frequently for periods from 30 to 45 minutes, during which time the mold has not been available for its primary function, namely, molding.

The molds have been so constructed as to withstand repeated alternating high oven temperatures and relatively low room temperatures, and consequently were expensive. For quantity production of such plastic foam articles, a large number of molds and large oven capacity were needed, as each mold was subjected to a prolonged cycle of operations including the curing step before it could be emptied and become available for the beginning of the next cycle.

Furthermore, even in the molding of many plastic foam articles which did not need an oven cure, numerous difficulties arose which consumed time and effort owing to the necessity for using a conventional mold release agent. Such agents are liquids, emulsions or dispersions which are sprayed, brushed or slushed on to the walls of the mold. They are intended to separate the mold from the molded article, and are designed to adhere firmly to the mold and not to adhere to the molded article. They often erode, however, and contaminate the molded article objectionably. When additional release agent is repeatedly added to the mold between pourings, the release agent often builds up too quickly or thickly in some areas. To avoid such build-up, the release agent must often be stripped from the mold and replaced. This is a troublesome, time-consuming and expensive operation. Conversely, if a portion of the mold walls is not covered by the release agent or becomes bare during repeated molding operations, the molded article may adhere to the mold walls tenaciously. Under such circumstances, there is also a loss of time and labor due to the cleaning of the mold as well as the enforced idling of equipment and scrapping of the defective molded article which results. In such cases, also, the mold surface or walls are subject to expensive damage caused by the cleaning operation.

In the respects mentioned, release agents are particularly unsatisfactory with new molds. Due to the varying porosity of the mold surfaces, discontinuities and other problems arise from the use of such release agents and require expensive break-in of new molds. Many conventional release agents are sensitive to narrow changes in temperature and are adversely affected by small variations in mold or cure temperatures. Some release agents do not adhere firmly to the mold unless they are preheated. In general, it will be observed that conventional mold release agents are a troublesome complication in the molding process.

The present invention is directed to the removal from the mold of molded plastic articles of the cellular elastomer types, but which require heat or a substantial amount of time for curing, before the start of final cure, to enable final cure to occur outside of the emptied mold so that the mold may immediately be re-used, thereby making it possible and economically practical to employ far fewer molds and relatively inexpensive molds and ovens. The word "cure" as used herein, refers to that treatment by time or temperature or both, required to impart the desired properties to the molded article.

The invention is further directed to lining the mold with a release liner of such nature as to provide an easily removable film covering the mold walls, the film being a suitable strong, flexible plastic other than any skin which may be formed at the surface of the foam, and such as to adhere to the molded plastic to the extent desired, which is easily inserted into the mold, which has definite shape, stability, thickness and other useful properties, which permits the molded article to be readily released from the mold and which releases as a unit with the article from the mold leaving the mold clean and ready for immediate reuse.

The invention further is directed to the provision of an economical method of molding and of curing plastics such as flexible and rigid foam plastics as well as certain other plastics which may initially be viscous or liquid and which reach the gel set stage after shaping thereof at room temperatures or slightly elevated temperatures, and in which method relatively crude or incomplete molds or jigs, adequate to hold a pre-shaped liner, may be used.

The invention is further directed to a molding method for plastics whereby a smooth surface is formed on the viscous, liquid or foam plastic by the interpositioning of a thin solid smooth film between the molded plastice and the walls of the mold cavity, the film being such as to adhere to the molded plastic, but being strippable or having strippable areas adapted to be stripped off to expose any desired parts of the surface of the molded plastic after cure.

The invention is further directed to a quick, efficient and relatively inexpensive and dependable method of molding foamed one shot polyurethane articles such as upholstery cushions with inexpensive equipment and enhancing the strength and lowering the cost of producing such cushions in large quantities.

The invention is further directed to the method of molding foamed polyurethane articles covered with a strong protective film of polyethylene or the like, such as cushions, padding, packing, insulation and the like and which are disclosed in our copending application Serial No. 226,840 for Foamed Elastomer Cushioning with Film Reinforcment filed on September 28, 1962.

The various objects of the invention will be clear from the description which follows and from the drawings, in which:

FIG. 1 is a diagrammatical vertical sectional view of a representative mold in open position and lined with a release liner, after the ingredients to produce foam have been inserted and the mold is about to be closed.

FIG. 2 is a similar view of the closed mold after the ingredients have foamed and gel set.

FIG. 3 is a similar view showing the mold cover removed and the set molded article being lifted out of the mold cavity.

FIG. 4 is a similar view of the molded article inverted after it has been cured and the flash trimmed off.

FIG. 5 is a similar fragmentary view on an enlarged scale of the trimmed edge portion of the molded article showing the exposed breather area of the foamed plastic resulting from the trimming operation.

FIG. 6 is a perspective view of a preformed release liner to fit the mold closely and to adhere to the mold-filling plastic thereby to serve as a shape-retaining envelope for the plastic when the mold is emptied.

The process of the present invention is applicable to plastics which are molded while in a liquid, viscous or foam condition and which may also require relatively prolonged curing after setting. The process permits the removal from the mold of the incompletely cured plastic article while it is still weak and easily damaged, making it possible to do so safely and to retain the proper shape of the article, though incomplete, during the transfer thereof to a curing station apart from the mold. No radical change in the general design of present molds is necessary, though a change to inexpensive mold materials and structures which need not withstand high temperatures or wide temperature changes is made possible. Also, simpler curing ovens are made feasible.

In what follows, the process will be described mainly in connection with one shot foamed polyurethane as the moldable material and polyethylene as the film, though it will be understood that substantially the same steps apply to other cellular plastics, and that the film may be a thin solid imperforate sheet of any flexible thin mold-releasing plastic adapted to adhere when treated or not treated, to the molded article.

Referring to FIG. 1, the mold 10 is shown with a separate weighted lid or cover 11 covering and projecting over the mold cavity 12 on all sides. Such a mold is adapted for the molding of suitable plastic foam such as polyurethane. The "one shot" polyurethane foam ingredients 13 are put into the mold only after the mold has been properly prepared. Such preparation comprises lining the walls of the cavity and the cover with a thin solid, but not necessarily one-piece, film 14 of suitable plastic, in distinction from the wax-like release agent heretofore generally used as a sprayed or brushed coating on the mold walls. The removable film 14 on the cavity walls and the similar film 15 on the inside of the cover can be formed in a number of different ways provided that the resulting film is strong, smooth and flexible, does not adhere firmly to the mold walls but can be made to adhere firmly or lightly to the foam as required.

As examples of suitable plastic, in sheet form, there are polyethylene, polypropylene, polyvinyl chloride, polyvinylidene chloride such as "Saran" and polyester such as "Mylar" or the like. As shown in FIG. 1, the release lining film 14, 15 is in the form of a sheet suitably shaped to fit the mold accurately and smoothly without significant wrinkling or interruption of the inner smooth surface thereof. For ease in removal, marginal flanges as 16 on the liner 14, and 19 on the liner part 15, project beyond the mold cavity 12 and beyond the top surface of the mold, and the under surface of the cover respectively. When the mold is closed, the liner parts for the cover and the cavity have a common marginal portion by means of which the resulting envelope for the plastic and the material enclosed therein may be manipulated after the mold is opened.

The liner 17 of FIG. 6 is vacuum formed of film plastic to the proper shape by suitable known vacuum forming apparatus. To retain the sheet or envelope liner in place against collapse or wrinkling, it may be bonded to the mold cover or walls with a thin layer of water or other temporary adhesive, or the liner may be held in place during the molding operation by vacuum applied to the mold cavity in a manner which need no illustration.

If it is intended that the liner be later stripped from the molded article, that part of the surface of the liner which comes into contact with the plastic should be of such character as to cause a weak bond to form therebetween. If however, the liner is intended to remain on the article permanently as a covering film, certain film materials such as polyethylene may have to be treated for the purpose. If stripping is to occur only at selected areas, such areas are either defined by score or weakening lines, or are made of pieces separate from the remainder of the liner. Treatment of the film may be accomplished in any of a number of ways similar to those used in making the surface printable, including etching, electrostatic treatment, flame treatment, abrasion or the like.

When a polyurethane foam article is the molded product, the foaming ingredients 13 expand to fill the liner completely, a skin being formed at the surface of engagement of the foam with the liner. As illustrated in FIG. 2, the expanded polyurethane has raised the weighted cover 11 slightly and has extruded as a thin layer 18 of escaping foam between the flanges 16 and 19 of the films 14 and 15 to form therewith the flash 20. Venting of the gases from the mold during expansion of the foam also takes place at the outside edges of the flanges and through the space therebetween as the cover lifts under the pressure of the gases.

The film adheres sufficiently well to the skin, whether the film surface is treated or not, to enable the foam filled liner to be manipulated after the foam 21 has gel set. For easy removal of the work 24, comprising the gelled foam 21 together with the liner 14, 15 which maintains the weak gel in the shape of the mold and against collapse or damage, the cover 11 is first lifted off the film 15 and the mold 10, leaving the film 15 adhering to the top surface of the foam. The flash 20 comprising the marginal parts 16, 19 and 18, is then lifted off the top of the mold 10 and engaged by suitable clamps 22 and 23 as shown in FIG. 3. Said clamps serve as handles for lifting the work 24 in its gel set stage out of the mold. Further to facilitate the release, compressed air may optionally be introduced between the mold walls and the film 14, in a manner which will now be obvious and needs no illustration, and shortly after the foam has fully expanded.

Up to this point, the process may be the same for molded articles requiring further cure or molded articles which, due to their high speed of cure or for other reasons, have cured in the mold. For articles requiring further cure, a curing step outside of the mold is performed by conveying the articles to a curing station or oven by means of the clamps 22, 23 or suitable conveyors, racks or the like with or without the clamps.

As shown in FIGS. 4 and 5, the excess flash 20 has been trimmed off the work 24 after the foam has been completely cured to produce the completed article 25. The quite narrow circumferential surface area 26 of the article, where the foam 21 is exposed by the trimming operation constitutes an advantageous venting means for entrapped air in foamed flexible articles such as cushions. Without such venting area, the flexible foam could be compressed, if at all, only with difficulty, since the entrapped air would also have to be compressed.

Referring to FIG. 6, the one piece plastic liner 17 there shown is adapted to be vacuum formed of sheet material rapidly and economically by known apparatus. A liner of initially solid material similar to the liner 14 or 17 may be fabricated in various other ways. A sheet of film may be die-cut with suitable flaps as a blank, folded into shape and heat sealed at the corners in the manner in which cartons and certain types of containers are made. Or strips of film may be laid in the mold in two perpendicular directions to become an effective liner without any joining or sealing other than the adherent foam. Or a crinkled sheet of film yieldable enough to be pressed by the expanding foam against the mold walls, may be laid loosely in the mold to form the liner.

Finally, the mold 10 of FIG. 3 having been emptied simultaneously of its molded contents and the liner without significant waiting time for curing, is immediately available for re-use, in a clean condition and without loss of time.

It will now be seen that by the use of a release liner of a strong flexible type fitted to the mold and temporarily held therein until the work has initially set, and which adheres to the work, it becomes possible to remove the fragile and collapsible foamed work from the mold immediately after the work has been completely formed and has reached a gelation stage, thereby to free the mold in a clean condition ready for forming the next piece of work; that the liner can be made to adhere to the work or to be stripped therefrom completely or at selected areas; that fewer and much less expensive molds need be used than heretofore, where as here, the mold need not go through a curing cycle; that the curing ovens need have lesser capacity than heretofore since they are not used to heat the molds but heat only the work; that the cost of molding appropriate plastics or foams thereof is considerably reduced; that the invention is applicable to a variety of plastics and articles made from such plastics, and that the objects of the invention have been adequately attained.

While certain specific forms of the invention have herein been shown and described, various obvious changes may be made therein without departing from the spirit of the invention defined by the appended claims.

We claim:

1. The method of molding, removing and curing articles of foamable plastic ingredients which require externally applied heat for curing and which gel set into fragile and collapsible shaped form before curing comprising lining the walls of an openable and closeable mold with a relatively strong release liner of plastic sheet having a mold release surface and adapted to have the foam adhere to the opposite surface of the sheet, the mold being of material not required to withstand the external temperature needed to cure the gel set foam, inserting the foamable ingredients within the liner, closing the mold, maintaining the mold closed until expansion of the ingredients is complete and until the foam has reached the gelation stage but before significant curing of the foam has occurred, opening the mold, separating the release liner from the walls of the mold to leave the walls clean and bare and ready for immediate re-use, removing the liner and its fragile gel state contents as a unit from the mold preparatory to curing said contents, and heat-curing said contents at a temperature deleterious to the mold and at a curing station independent of the location of the mold.

2. The molding, removing and curing method of claim 1, the foam in its gel state within the liner prior to curing being of such fragility and of such low strength and so easily damaged as to be barely able to support its own weight and to require extraneous support on the major part of the surface area thereof during and subsequent to the removal thereof from the mold.

3. The molding, removing and curing method of claim 1, the foamable ingredients being one shot polyurethane.

4. The molding, removing and curing method of claim 3, the liner being of plastic material treated on one surface to adhere permanently to the foam.

5. The molding, removing and curing method of claim 3, the liner being of polyethylene sheet and being preformed in the mold cavity to the shape of the article and covering the major part of the surface of the foam in the gel state of the foam.

6. The molding, removing and curing method of claim 3, the lining of each part of the split mold being accomplished separately to provide a projecting marginal portion on each liner overlapping the marginal portion of the other liner when the mold is closed.

7. The molding, removing and curing method of claim 3, applying vacuum to the release surface of the liner when the mold is closed to hold the liner to the walls of the mold during the expansion of the foam.

8. The molding, removing and curing method of claim 3, the liner being of polyethylene sheet, providing a marginal portion on the liner of each mold part overlapping the marginal portion of the other mold part, applying vacuum to the liner prior to and during the expansion of the ingredients to hold the liner to the mold walls, and stripping the liner from the cured article.

9. The molding, removing and curing method of claim 8, and applying fluid pressure to the outer surface of the liner after discontinuing the application of vacuum when the mold is open during the removal of the liner and the contents thereof from the mold.

10. In the method of molding, manipulating and curing of one shot polyurethane foam, utilizing an openable and closeable mold with rigid cavity walls but incapable of withstanding the curing temperature of the foam for shaping the foam, inserting one shot polyurethane foaming ingredients into the mold, expanding the foam in the mold only until the foam reaches the gel state, then removing the foam in its gel state, wherein the foam is fragile and readily collapsible, to a curing station remote from the mold while protecting the foam against damage and maintaining the foam in the shape in which it has been molded, and applying heat to the gel state foam at said station to cure the foam at a temperature deleterious to the mold.

References Cited by the Examiner

UNITED STATES PATENTS

| 2,847,711 | 8/58 | Hibbard | 18—55 |
| 2,898,634 | 8/59 | Alderfer | 18—59 |

FOREIGN PATENTS

| 839,657 | 6/60 | Great Britain. |
| 873,518 | 7/61 | Great Britain. |

ALEXANDER H. BRODMERKEL, *Primary Examiner.*

MORRIS LIEBMAN, *Examiner.*